US012784778B2

(12) United States Patent
Xu et al.

(10) Patent No.: US 12,784,778 B2
(45) Date of Patent: Nov. 3, 2026

(54) AUDIO AND VIDEO EDITING METHOD AND APPARATUS, ELECTRONIC DEVICE AND STORAGE MEDIUM

(71) Applicant: Douyin Vision Co., Ltd., Beijing (CN)

(72) Inventors: Zhiyong Xu, Beijing (CN); Jian Li, Beijing (CN)

(73) Assignee: Douyin Vision Co., Ltd., Beijing (CN)

( * ) Notice: Subject to any disclaimer, the term of this patent is extended or adjusted under 35 U.S.C. 154(b) by 71 days.

(21) Appl. No.: 18/499,678

(22) Filed: Nov. 1, 2023

(65) Prior Publication Data

US 2024/0144975 A1 May 2, 2024

(51) Int. Cl.
*G11B 27/031* (2006.01)

(52) U.S. Cl.
CPC .................................. *G11B 27/031* (2013.01)

(58) Field of Classification Search
None
See application file for complete search history.

(56) References Cited

U.S. PATENT DOCUMENTS 7,441,020 B2 * 10/2008 Dideriksen ......... G06F 9/44526 709/221
8,977,102 B2 * 3/2015 Lindroos ................. G06F 3/165 386/239
9,270,964 B1 2/2016 Tseytlin
2002/0116716 A1 * 8/2002 Sideman .......... H04N 21/23106 725/86
2010/0180224 A1 * 7/2010 Willard ................ G10H 1/0025 715/773
2012/0272173 A1 * 10/2012 Grossman ............ G11B 27/034 715/772
2014/0325034 A1 * 10/2014 Mclaughlin ...... H04N 21/26258 709/219
2019/0265986 A1 * 8/2019 Mathur ................... G06F 13/38
2019/0311202 A1 * 10/2019 Lee .......................... G06T 9/002
2020/0105282 A1 * 4/2020 Kim .................... G10L 19/0208

(Continued)

FOREIGN PATENT DOCUMENTS

CN 103903625 A 7/2014
CN 104091608 A 10/2014
CN 105957542 A 9/2016

(Continued)

OTHER PUBLICATIONS

Notice of Registration Procedures received from Chinese patent application No. 202211358778.0 mailed on Jan. 6, 2025, 10 pages (5 pages English Translation and 5 pages Original Copy).

*Primary Examiner* — Gelek W Topgyal

(57) ABSTRACT

Embodiments of the present disclosure provide an audio and video editing method and apparatus, an electronic device and a storage medium. The method includes: when it is detected that audio and video data to be edited is triggered to be played, acquiring each audio and video editing plug-in to be used; determining target audio and video editing plug-ins according to pre-received audio and video state management data and each audio and video editing plug-in to be used; based on functional modules that are integrated in the target audio and video editing plug-ins, editing the audio and video data to be edited, so as to obtain target audio and video data; and playing the target audio and video data based on a target audio routing.

15 Claims, 4 Drawing Sheets

(56) References Cited

U.S. PATENT DOCUMENTS

| | | | |
|---|---|---|---|
| 2022/0130427 | A1 | 4/2022 | Allibhai et al. |
| 2022/0238139 | A1 | 7/2022 | Zheng et al. |

FOREIGN PATENT DOCUMENTS

| | | | | | |
|---|---|---|---|---|---|
| CN | 109218793 | A | | 1/2019 | |
| CN | 105957542 | B | * | 3/2019 | ........... G11B 27/031 |
| CN | 110457049 | A | * | 11/2019 | ............... G06F 8/61 |
| CN | 113407275 | A | | 9/2021 | |
| CN | 113704590 | A | | 11/2021 | |
| CN | 114115659 | A | | 3/2022 | |
| CN | 114138256 | A | | 3/2022 | |
| CN | 115129211 | A | | 9/2022 | |
| CN | 115134658 | A | | 9/2022 | |
| CN | 115691571 | A | | 2/2023 | |

* cited by examiner

AUDIO AND VIDEO EDITING METHOD AND APPARATUS, ELECTRONIC DEVICE AND STORAGE MEDIUM

CROSS-REFERENCE TO RELATED APPLICATIONS

The present disclosure claims the priority to the Chinese patent application No. 202211358778.0 filed on Nov. 1, 2022 and entitled "AUDIO AND VIDEO EDITING METHOD AND APPARATUS, ELECTRONIC DEVICE AND STORAGE MEDIUM", the disclosure of which is incorporated herein by reference in its entirety.

TECHNICAL FIELD

Embodiments of the present disclosure relate to the technical field of audio and video editing processing, and in particular to an audio and video editing method and apparatus, an electronic device and a storage medium.

BACKGROUND

With the development of the Internet, more and more users can edit respective audio and video content and publish the same. In an audio and video editing scenario, operations that need to be performed include audio and video data storage, cropping, play control, reverberation, etc.

The implementation of the above operations often requires different applications or software to complete, resulting in problems of low efficiency and weak functionality.

SUMMARY

In a first aspect, embodiments of the present disclosure provide an audio and video editing method, including:

- when it is detected that audio and video data to be edited is triggered to be played, acquiring each audio and video editing plug-in to be used;
- determining target audio and video editing plug-ins according to pre-received audio and video state management data and each audio and video editing plug-in to be used;
- based on functional modules that are integrated in the target audio and video editing plug-ins, editing the audio and video data to be edited, so as to obtain target audio and video data; and
- playing the target audio and video data based on a target audio routing.

In a second aspect, embodiments of the present disclosure further provide an audio and video editing apparatus, including:

- an audio and video editing plug-in acquisition module, which is used for acquiring, when it is detected that audio and video data to be edited is triggered to be played, each audio and video editing plug-in to be used;
- a target audio and video editing plug-in determination module, which is used for determining target audio and video editing plug-ins according to pre-received audio and video state management data and each audio and video editing plug-in to be used;
- an audio and video data to be edited processing module, which is used for editing, based on functional modules that are integrated in the target audio and video editing plug-ins, the audio and video data to be edited, so as to obtain target audio and video data; and
- a target audio and video data play module, which is used for playing the target audio and video data based on a target audio routing.

In a third aspect, embodiments of the present disclosure further provide an electronic device, including:

- one or more processors; and
- a storage apparatus, which is used for storing one or more programs,
- when the one or more programs are executed by the one or more processors, the one or more processors being caused to implement the audio and video editing method according to any one of embodiments of the present disclosure.

In a fourth aspect, embodiments of the present disclosure further provide a non-transitory storage medium containing computer-executable instructions which, when executed by a computer processor, are used to perform the audio and video editing method according to any one of embodiments of the present disclosure.

BRIEF DESCRIPTION OF THE DRAWINGS

The above and other features, advantages, and aspects of various embodiments of the present disclosure will become more apparent with reference to the following specific embodiments taken in conjunction with the accompanying drawings. Throughout the accompanying drawings, the same or similar reference numbers refer to the same or similar elements. It is to be understood that the accompanying drawings are schematic and that originals and elements are not necessarily drawn to scale.

DETAILED DESCRIPTION

Figure 1:
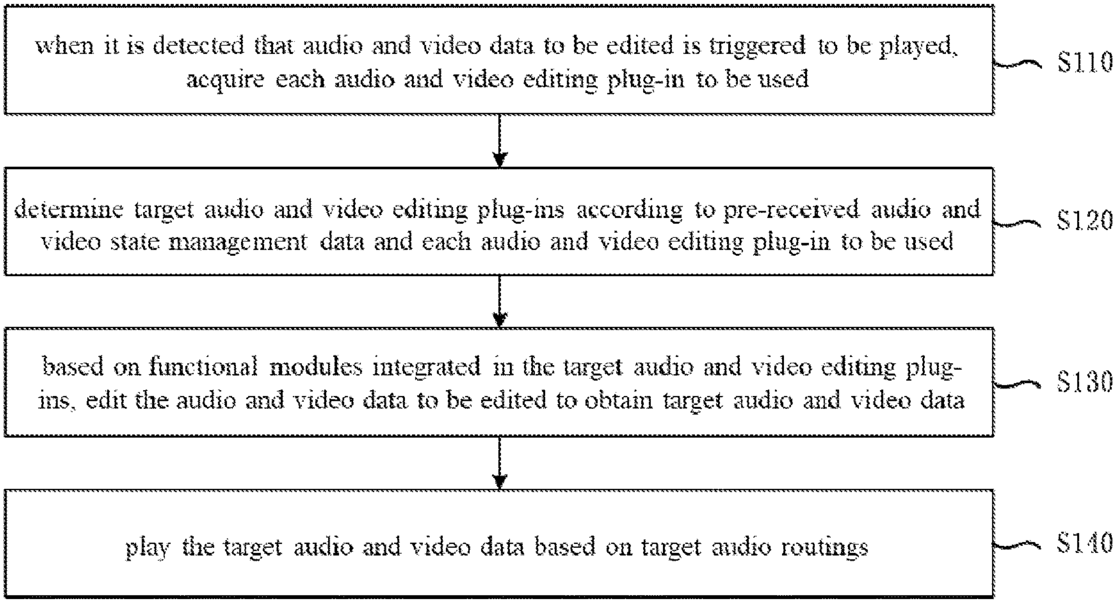
FIG. 1 is a schematic flowchart of an audio and video editing method provided in an embodiment of the present disclosure.

The present disclosure provides an audio and video editing method and apparatus, an electronic device and a storage medium, so that the effect of carrying out, based on a browser, plug-in editing on audio and video data to be edited is achieved, and an audio and video editing process is simplified. In addition, target audio routings can be expanded by introducing audio and video editing plug-ins, which further improves the user experience.

In the technical solutions provided in the embodiments of the present disclosure, when it is detected that audio and video data to be edited is triggered to be played, each audio and video editing plug-in to be used is acquired; target audio and video editing plug-ins are then determined according to pre-received audio and video state management data and each audio and video editing plug-in to be used; further, based on functional modules that are integrated in the target audio and video editing plug-ins, the audio and video data to be edited is edited, so as to obtain target audio and video data; and the target audio and video data is finally played based on target audio routing(s). Thus, it solves the problems of low efficiency and weak functionality in the prior art where editing and processing processes often require different applications or software to complete. It achieves the effect of carrying out, based on a browser, plug-in editing on audio and video data to be edited, and an audio and video editing process is simplified. In addition, target audio routings can be expanded by introducing audio and video editing plug-ins, which further improves the user experience.

Embodiments of the present disclosure will be described in more detail below with reference to the accompanying drawings. Although certain embodiments of the present disclosure are shown in the accompanying drawings, it should be understood that the present disclosure may be embodied in various forms and should not be construed as limited to the embodiments set forth herein, which rather are provided for more thorough and complete understanding of the present disclosure. It should be understood that the accompanying drawings and embodiments of the present disclosure are for illustrative purposes only and are not intended to limit the scope of the present disclosure.

It should be understood that various steps described in the method implementations of the present disclosure may be executed in different orders and/or in parallel. In addition, method implementations may include additional steps and/or omit performance of illustrated steps. The scope of the present disclosure is not limited in this regard.

The term “include” and its variations used herein are open-ended, i.e., “including but not limited to”. The term “based on” means “based at least in part on”. The term “one embodiment” means “at least one embodiment”; the term “another embodiment” means “at least one additional embodiment”; and the term “some embodiments” means “at least some embodiments”. Relevant definitions of other terms will be given in the description below.

It should be noted that concepts such as “first” and “second” mentioned in the present disclosure are only used to distinguish different apparatuses, modules or units, and are not used to limit the order or interdependence of functions performed by these apparatuses, modules or units.

It should be noted that the modifications of “one” and “a plurality of” mentioned in the present disclosure are illustrative and not restrictive. Those skilled in the art should understand that unless the context clearly indicates otherwise, it should be understood as “one or a plurality of”.

Names of messages or information exchanged among a plurality of apparatuses in the implementations of the present disclosure are for illustrative purposes only and are not used to limit the scope of these messages or information.

It can be understood that before the technical solutions disclosed in various embodiments of the present disclosure, users should be informed of the type, scope of use, usage scenarios, etc. of the personal information involved in the present disclosure in an appropriate manner in accordance with relevant laws and regulations and obtain the user’s authorization.

For example, in response to receiving an active request from a user, prompt information is sent to the user to clearly remind the user that the operation requested will require the acquisition and use of the user’s personal information, so that the user can autonomously choose, based on the prompt information, whether to provide personal information to software or hardware such as electronic devices, applications, servers or storage medium that perform operations of the technical solutions of the present disclosure.

As an optional but non-limiting implementation method, in response to receiving an active request from a user, the method of sending prompt information to the user may be, for example, a pop-up window, and the prompt information may be presented in the form of text in the pop-up window. In addition, the pop-up window can also contain a selection control for the user to choose “agree” or “disagree” to provide personal information to the electronic device.

It can be understood that the above process of notifying and acquiring user authorization is only illustrative and does not limit the implementations of the present disclosure. Other methods that satisfy relevant laws and regulations can also be applied to the implementations of the present disclosure.

It can be understood that data (including but not limited to the data itself, the acquisition or use of the data) involved in these technical solutions should comply with the requirements of corresponding laws, regulations and related regulations.

Before introducing these technical solutions, an exemplary description of an application scenario can be provided. The technical solutions of the embodiments of the present disclosure can be applied to any scenario in which audio and video data is edited. For example, a browser-based display interface can display audio and video data to be edited; when a triggering operation on the audio and video data to be edited is detected, target audio and video editing plug-ins can be determined from among the pre-built audio and video editing plug-ins to be used, so as to edit, based on the target audio and video editing plug-in, the audio and video data to be edited; and at the same time, target audio routings are created, so as to play the target audio and video data based on the target audio routings after the target audio and video data is obtained, so that the editing and play processes of the audio and video data to be edited can be realized on the browser display interface, achieving the effect of simplifying an audio and video data editing process.

FIG. 1 is a schematic flowchart of an audio and video editing method provided in an embodiment of the present disclosure. The embodiment of the present disclosure is suitable for the case of editing, based on a pre-built target audio and video editing plug-in, audio and video data to be edited, and playing the target audio and video data obtained after the editing. The method can be executed by an audio and video editing apparatus which can be implemented in the form of software and/or hardware, optionally, through an electronic device which can be a mobile terminal, a PC or a server, etc. The technical solution provided in the embodiment of the present disclosure can be executed based on a client, a server, or the cooperation between the client and the server.

As shown in FIG. 1, the method includes:

S110, when it is detected that audio and video data to be edited is triggered to be played, acquiring each audio and video editing plug-in to be used.

The audio and video data to be edited may be a multimedia data stream that stores sound content and image content. At the same time, the sound content and image content stored in this data stream may be sound information and image information that the user currently needs to edit. The audio and video data to be edited may also be a data stream that needs to be re-edited. For example, re-editing may include: storage, cropping, play control, reverberation, filtering, etc. for audio and video data. For example, the audio and video data to be edited may be any audio and video clips that need to be edited. In the practical application process, a plurality of audio and video data may be uploaded to a system, and a play trigger control may be set in any area of these audio and video data. When a trigger operation on the play trigger control of any audio and video data is detected, this audio and video data can be used as the audio and video data to be edited, and each audio and video editing plug-in to be used is acquired.

The audio and video editing plug-ins to be used may be functional plug-ins capable of editing audio and video data. For example, the audio and video editing plug-ins to be used may include noise reduction editing plug-ins, volume editing plug-ins, hot key editing plug-ins, reverb editing plug-ins, export editing plug-ins, fade-in and fade-out plug-ins, etc.

Optionally, the audio and video editing plug-ins to be used include a plurality of hook files which include function files used to edit the audio and video data to be edited.

In this embodiment, the hook files may be files used to perform audio and video editing operations. Optionally, the hook files may include, but are not limited to, a hook file for playing audio and video data to be edited (play), a hook file for playing tracks (play Track), a hook file for playing clips (play Clip), a hook file for stopping playing (stop), a hook file for changing content (content Change), a hook file for changing selections (selection Change), a hook file for destroying audio and video data to be edited (destory), etc. It should be noted that the hooks in the audio and video editing plug-ins to be used can be determined based on the developer's needs, and in the subsequent application process, newly generated hook files can be sent to each audio and video editing plug-in to be used at any time. The advantages of such setting lie in that a recording module in target audio routings can be created, the target audio routings can be expanded, and a variety of audio editing effects can be achieved.

Figure 2:
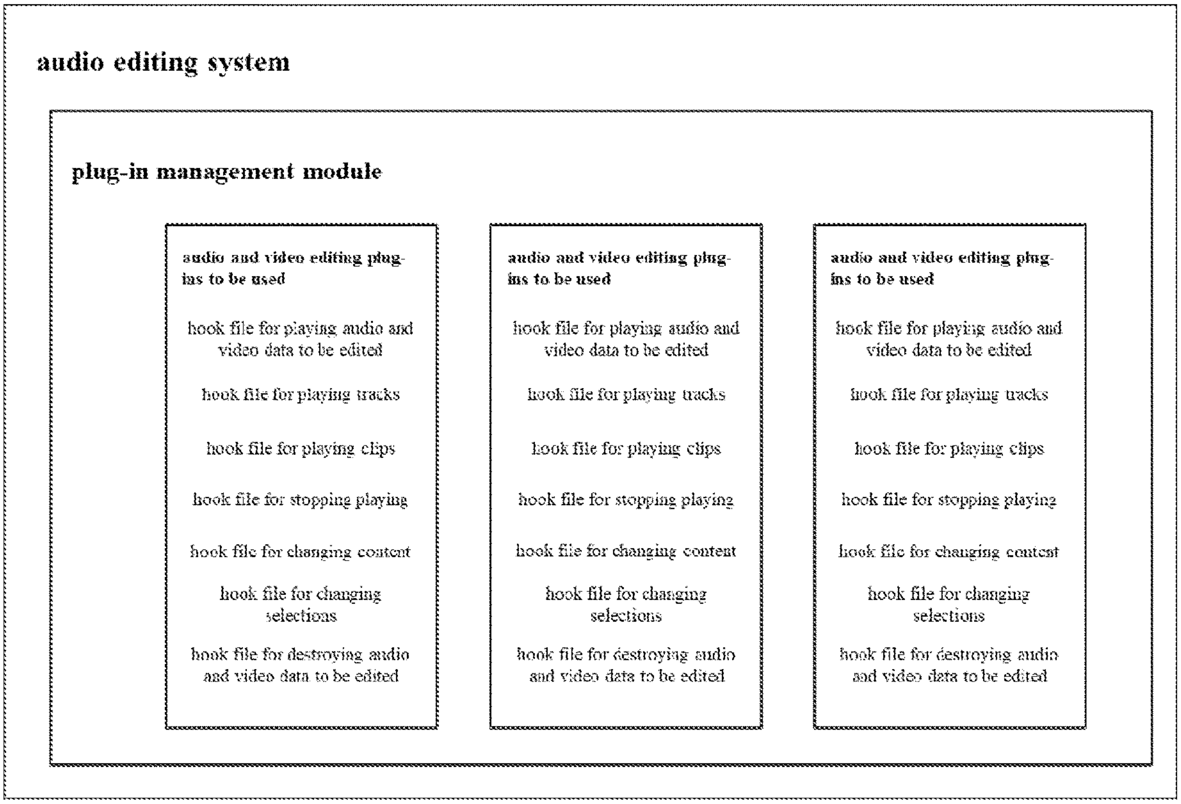
FIG. 2 is a schematic structural diagram of a plug-in management module provided in an embodiment of the present disclosure.

For example, the architecture of a plug-in system containing audio and video editing plug-ins to be used can be described with reference to FIG. 2: the containing relationship of the plug-in system can be that an audio editor includes a plug-in management module which contains at least one audio and video editing plug-in to be used, wherein each audio and video editing plug-in to be used contains a plurality of hook files. The hook files contained in the audio and video editing plug-ins to be used can include a hook file for playing audio and video data to be edited, a hook file for playing tracks, a hook file for playing clips, a hook file for stopping playing, a hook file for changing content, a hook file for changing selections, and a hook file for destroying audio and video data to be edited.

The hook file for playing audio and video data to be edited can be triggered once when a trigger operation of the audio and video data to be edited is detected; the hook file for playing tracks can be triggered once in the case where a trigger operation of any track data in the audio and video data to be edited is detected when the audio and video data to be edited being played, and by triggering this hook file, a connection method of target audio routings, web audio interface context and track data can be acquired; the hook file for playing tracks can be triggered once in the case where a trigger operation of any audio clip data in the audio and video data to be edited is detected when the audio and video data to be edited being played, and by triggering this hook file, a connection method of target audio routings, web audio interface context and track data can be acquired; the hook file for stopping playing can be triggered once when a stop play operation is detected; the hook file for changing content can be triggered once when audio and video state management data changes; the hook file for changing selections can be triggered once when the area to be edited of the audio and video data to be edited changes; and the hook file for destroying audio and video data to be edited can be triggered once when the audio editor is destroyed.

In the practical application process, the audio and video editing plug-ins to be used can be pre-stored in a system plug-in library in the early development stage. When it is detected that a user triggers the play control of the audio and video data to be edited, each audio and video editing plug-in to be used can be directly retrieved from the plug-in library.

It should be noted that the audio and video editing plug-ins to be used in the plug-in library are in a dynamic update state. When other audio and video editing plug-ins are developed based on user needs in the subsequent application process, these subsequently developed audio and video editing plug-ins can be updated to the plug-in library as audio and video editing plug-ins to be used, so that when an editing operation of the audio and video data to be edited is subsequently detected, each audio and video editing plug-in to be used can be called.

It should also be noted that the number of audio and video editing plug-ins to be used and the functions that can be implemented can be set based on actual needs, that is, each audio and video plug-in to be used can correspond to a plug-in management system which is extensible, and each audio and video editing plug-in to be used in the plug-in management system can be updated at any time.

In a specific implementation, when the user wants to edit any audio and video to be edited, the user can input a trigger operation into a play trigger control of the audio and video data to be edited. When it is detected that the audio and video data to be edited is triggered to be played, each audio and video editing plug-in to be used can be acquired, so as to process, based on each audio and video editing plug-in to be used, the audio and video data to be edited.

S120, determine target audio and video editing plug-ins according to pre-received audio and video state management data and each audio and video editing plug-in to be used.

In this embodiment, the audio and video state management data can be used to represent all data expressions of the audio and video data to be edited during the editing process. The audio and video state management data may include all data applied to the editing of the audio and video data to be edited. Optionally, the audio and video state management data may include track data, audio data, audio effect parameters, audio meta information, global configuration data, etc. For example, the audio and video state management data can be represented by JSON. The target audio and video editing plug-ins may be plug-ins that edit the audio and video data to be edited. It should be noted that the target audio and video editing plug-ins may be one plug-in among the audio and video editing plug-ins to be used, or may be a plurality of plug-ins among the audio and video editing plug-ins to be used.

In practical applications, corresponding audio and video state management data can be generated based on the editing operation of the audio and video data to be edited. When an audio and video editing interface is opened, the pre-generated audio and video state management data can be sent to the audio and video editing system, so that when the user's play trigger operation of the audio and video data to be edited is detected, the editing operation to be performed on the audio and video data to be edited can be determined based on the audio and video state management data.

In the practical application process, when the target audio and video editing plug-ins are determined in each audio and video editing plug-in to be used, each audio and video editing plug-in to be used can be traversed according to the audio and video state management data. When it is detected that the audio and video state management data contains fields corresponding to at least one audio and video editing plug-in to be used, these audio and video editing plug-ins to be used can be used as target audio and video editing plug-ins.

Optionally, determining target audio and video editing plug-ins according to pre-received audio and video state management data and each audio and video editing plug-in to be used includes: determining the number of tracks based on the audio and video state management data, and calling corresponding track data in sequence; being based on collections of data corresponding to at least one piece of audio and video editing feature data in the track data and the audio and video state management data; and for each audio and video editing plug-in to be used, if the audio and video editing plug-in currently to be used includes the audio and video editing feature data in the collections of data, determining that the audio and video editing plug-in currently to be used is the target audio and video editing plug-in.

Those skilled in the art should understand that tracks are parallel "tracks" displayed one by one in audio editing software. Each track defines the properties of the track, such as the track's timbre, timbre library, channel number, input/output port, volume, etc. Correspondingly, the track data may be data used to characterize the properties of the track. Optionally, the track data can be used to describe the details, location, play duration, etc. of the tracks. The audio and video editing feature data may be data used to characterize audio and video editing properties.

In a specific implementation, after each audio and video editing plug-in to be used is acquired, in order to determine target audio and video editing plug-ins in each audio and video editing plug-in to be used, the pre-received audio and video state management data can be parsed; the number of tracks is determined according to the audio and video state management data; and track data is called sequentially. Further, collections of data corresponding to at least one piece of audio and video editing feature data are determined from among the audio and video state management data, and each audio and video editing plug-in to be used is traversed according to each audio data and each collection of data. For each audio and video editing plug-in to be used, if data that matches the audio and video editing feature data in each collection of data is detected in the audio and video editing plug-in currently to be used, the current audio and video editing plug-in can be used as the target audio and video editing plug-in. The advantage of such setting lies in that target audio and video editing plug-ins corresponding to the audio and video state management data can be determined from among a plurality of audio and video editing plug-ins to be used, so that the effect of editing, based on user needs, the audio and video data to be edited can be achieved.

S130, based on functional modules that are integrated in the target audio and video editing plug-ins, edit the audio and video data to be edited, so as to obtain target audio and video data.

The functional modules can be a collection of program elements such as data descriptions and executable statements. In this embodiment, the functional modules may be a collection of execution statements and data containing specific functions that the target audio and video editing plug-ins can implement. It should be noted that different target audio and video editing plug-ins can realize different audio and video editing functions. Therefore, the data files contained in the functional modules integrated in each target audio and video editing plug-in are also different. In the practical application process, the functional modules integrated in the target audio and video editing plug-ins can be dynamically adjusted, and which specific functional modules are included in the target audio and video editing plug-ins can be determined based on the user's current needs during each editing process.

In this embodiment, the target audio and video data may be a multimedia data stream that stores sound content and image content. At the same time, the sound content stored in this data stream may be sound information that meets the user's current needs.

In the practical application process, after the target audio and video editing plug-ins are determined, the functional modules integrated in the target audio and video editing plug-ins can be determined, and the audio and video data to be edited is edited based on audio and video editing execution statements contained in the functional modules, so that the audio and video data to be edited can be edited into audio and video data that meets the user's current needs. At this time, the audio and video data obtained after the editing can be used as target audio and video data. For example, if the target audio and video plug-ins are volume editing plug-ins and the editing data contained in the functional modules integrated therein is to adjust the volume to "1", the finally obtained target audio and video data is audio and video data that adjusts the volume of the audio and video data to be edited to "1".

It should be noted that when the audio and video data to be edited is edited based on the functional modules that are integrated in the target audio and video editing plug-ins, in the case of a plurality of target audio and video plug-ins, each target audio and video editing plug-in can be traversed. At the same time, since the audio and video data to be edited would be played based on a terminal device after the editing ends and the target audio and video data is obtained, in order to realize a play function of the target audio and video data, corresponding target audio routings will be generated after each target audio and video editing plug-in processes the audio and video data to be edited, so as to play the target audio and video data based on the target audio routings. It should also be noted that in order to realize the function of playing the target audio and video data based on the target audio routings, an audio processing module that contains both input and output can also be created to connect the target audio and video data to its corresponding play terminal, thereby achieving play.

Based on this, the process of determining target audio and video editing plug-ins and editing, based on the target audio and video editing plug-ins, the audio and video data to be edited also includes: creating a recording module to connect to the target audio routings.

In this embodiment, the recording module may be a module that processes audio and video data and can implement play of the processed audio and video data. A target audio routing may be an audio processing graph that is built from audio modules linked together. The target audio routings may contain a plurality of modules, optionally a data source module, a recording module, a destination module, etc. The target audio routings can control the creation of the modules contained therein, as well as the execution of audio processing or data stream decoding, etc.

In the practical application process, during the process of editing the audio and video data to be edited based on the target audio and video editing plug-ins, in order to connect the processed audio and video data to be edited to the play terminal for play, a corresponding recording module can be created, and the recording module is connected to the target audio routings, so that the processed audio and video data to be edited can be connected to a predetermined destination after being output. The advantage of such setting lies in that the construction of the target audio routings can be realized, so that the target audio and video data can be played based on the constructed target audio routings, thereby realizing the play function of the target audio and video data.

S140, play the target audio and video data based on target audio routing(s).

In this embodiment, after the target audio and video data is obtained, the target audio and video data can be played according to various modules that are connected in sequence in the target audio routings.

It should be noted that if there are a plurality of target audio and video editing plug-ins, corresponding target audio routings will be generated after editing the audio and video data to be edited based on each target audio and video editing plug-in is completed. However, when the target audio and video data is played based on target audio routing(s), a target audio routing that is finally used to play the target audio and video data can be determined from among various target audio routings, so that the target audio and video data can be played based on the determined target audio routing.

Based on this and the above technical solutions, the method also includes: using the target audio routing corresponding to the last target audio and video editing plug-in as the target audio routing that is finally used to play the target audio and video data.

In the practical application process, target audio routings corresponding to each target audio and video plug-in will be generated after the audio and video data to be edited is edited by a plurality of target audio and video editing plug-in. After all target audio and video editing plug-ins are traversed, the target audio routing corresponding to the last target audio and video editing plug-in can be used as the target audio routing that is finally used to play the target audio and video data, so that this target audio routing can be used to play the target audio and video data. The advantages of such setting lie in that the play function of the target audio and video data can be realized, and the visualization of an audio and video data editing process can be achieved.

It should be noted that the audio and video editing system provided in this embodiment may also include a selection management module (Selection Manager) and a clopboard management module (Clopboard Manager). In the Selection Manager, Selection can be described in seconds, and deletion, copy and other operations can be performed on the audio and video data to be edited through selections; and the Clopboard Manager provides a clopboard which can perform corresponding operations on the audio and video data to be edited and also depends on the Selection Manager.

Figure 3:
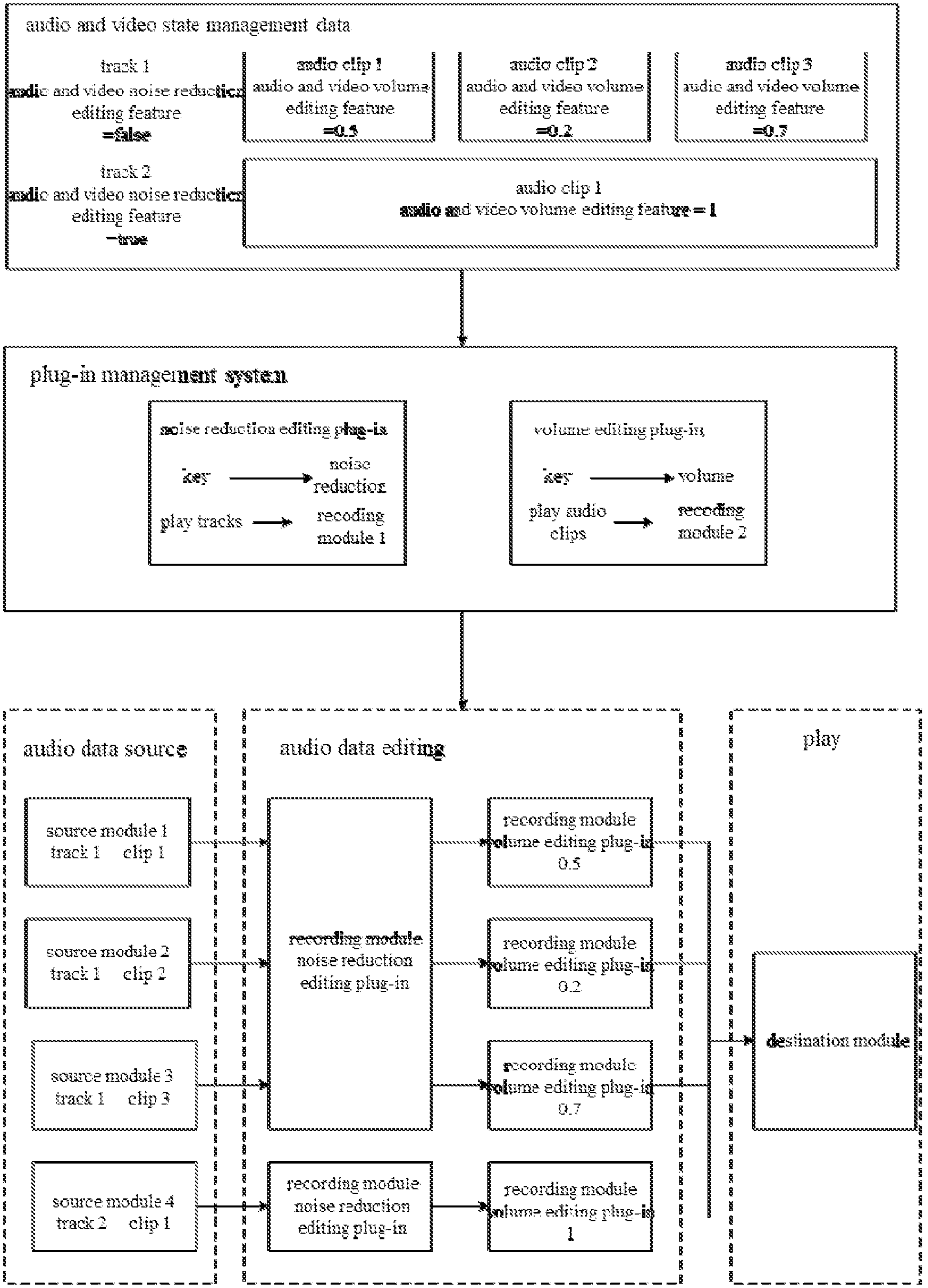
FIG. 3 is a schematic flowchart of an audio and video editing method provided in an embodiment of the present disclosure.

For example, the specific execution process of the audio and video editing method can be described in conjunction with FIG. 3.

As shown in FIG. 3, when a play operation of the audio and video data to be edited is detected, each audio and video editing plug-in to be used can be obtained; each audio and video editing plug-in to be used is traversed based on a plug-in management module; play Track is called in turn according to the number of tracks (Track) in the audio and video state management data, and corresponding track data, namely a track 1 and a track 2, is uploaded; based on the track data and audio and video editing feature data (Attributes) in the audio and video state management data, the target audio and video plug-ins are determined as noise reduction editing plug-ins and volume editing plug-ins from among the audio and video editing plug-ins to be used, and a corresponding recording module (Audio node) is created to connect to the target audio routings (Audio Routing Graph); play Clip is called in turn according to the number of audio clips (Clip) in the audio state management data, and corresponding audio clip data is uploaded, that is, the track 1 includes an audio clip 1, an audio clip 2 and an audio clip 3, and the track 2 includes the audio clip 1; based on the audio clip data and the audio and video editing feature data (Attributes) in the audio and video state management data, the target audio and video plug-ins are determined as noise reduction editing plug-ins and volume editing plug-ins from among the audio and video editing plug-ins to be used, and a corresponding recording module (Audio node) is created to connect to the target audio routings (Audio Routing Graph); and after the traversal of each target audio and video editing plug-in is completed, the target audio and video data can be played according to the target audio routing (Audio Routing Graph) corresponding to the last target audio and video editing plug-in.

In the technical solutions provided in the embodiments of the present disclosure, when it is detected that audio and video data to be edited is triggered to be played, each audio and video editing plug-in to be used is acquired; target audio and video editing plug-ins are then determined according to pre-received audio and video state management data and each audio and video editing plug-in to be used; further, based on functional modules that are integrated in the target audio and video editing plug-ins, the audio and video data to be edited is edited, so as to obtain target audio and video data; and the target audio and video data is finally played based on target audio routing(s). Thus, it solves the problems of low efficiency and weak functionality in the prior art where editing and processing processes often require different applications or software to complete. It achieves the effect of carrying out, based on a browser, plug-in editing on audio and video data to be edited, and an audio and video editing process is simplified. In addition, target audio routings can be expanded by introducing audio and video editing plug-ins, which further improves the user experience.

Figure 4:
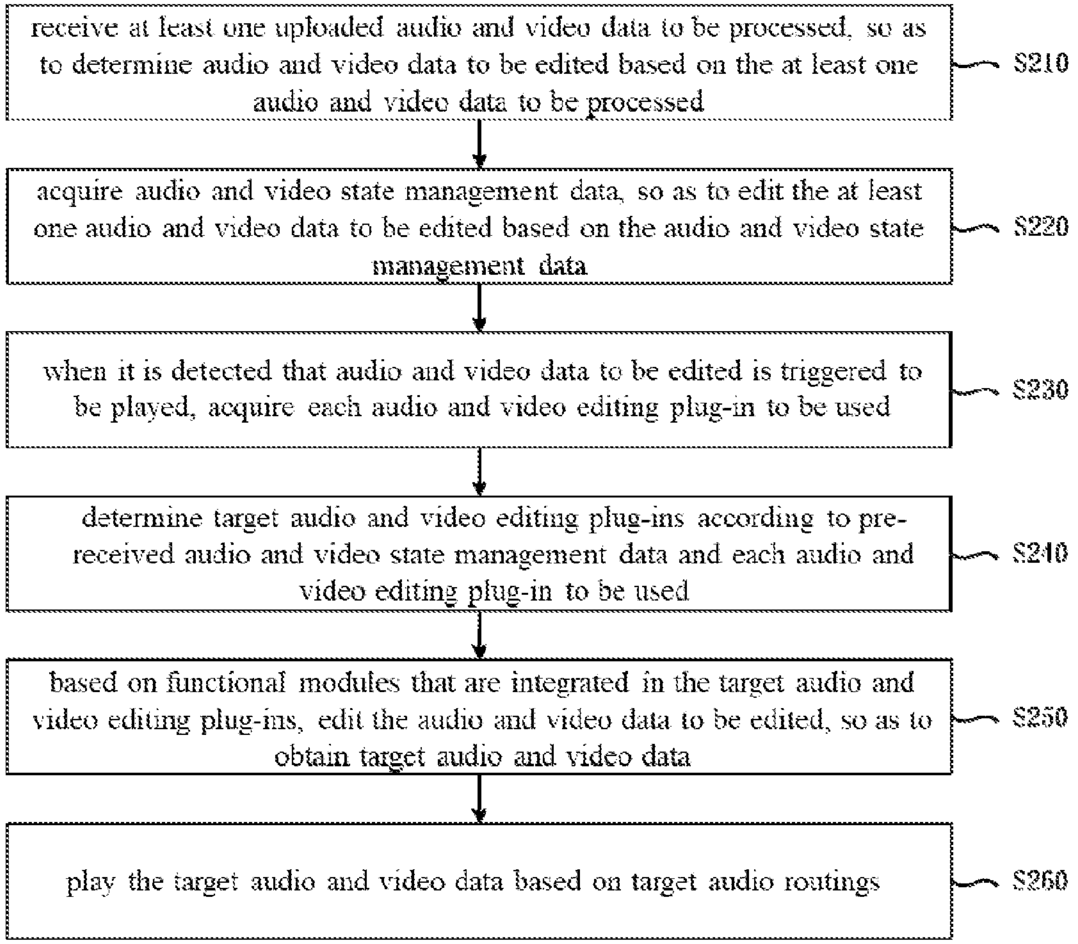
FIG. 4 is a schematic flowchart of an audio and video editing method provided in an embodiment of the present disclosure.

FIG. 4 is a schematic flowchart of an audio and video editing method provided in an embodiment of the present disclosure. Based on the foregoing embodiments, the audio and video data to be edited can be determined from among the uploaded audio and video data to be processed, and the audio and video state management data can be acquired, so as to edit, based on the audio and video state management data, the audio and video data to be edited, referring to the technical solution of this embodiment for its specific implementation. The technical terms that are the same as or corresponding to the above embodiments will not be described again here.

As shown in FIG. 4, the method specifically includes the following steps:

S210, receive at least one uploaded audio and video data to be processed, so as to determine, based on the at least one audio and video data to be processed, audio and video data to be edited.

In this embodiment, the audio and video data to be processed may be audio and video data that currently needs to be processed and uploaded to the audio and video editing system. There can be one or more audio and video data to be processed. When there is one piece of audio and video data to be processed, this audio and video data to be processed can be used as the audio and video data to be edited; and when there are a plurality of pieces of audio and video data to be processed, the audio and video data to be edited can be determined, based on user needs, from among the plurality of pieces of audio and video data to be processed.

It should be noted that the audio and video data that needs to be processed can be uploaded to the system in real time or periodically, so that the audio and video data to be edited can be determined based on the uploaded audio and video data to be processed.

In the practical application process, the audio and video data to be processed that needs to be edited can be uploaded to the system, and the uploaded audio and video data to be processed can be stored in a database. When an editing trigger operation of the audio and video data to be processed is detected, the audio and video data to be processed can be displayed in a display interface through a list or other display forms, so that the user can select among the audio and video editing data to be processed, so as to determine audio and video data to be edited. Another implementation method can lie in that: after the uploaded audio and video data to be processed is stored in the database, audio and video data filtering conditions can be entered in a search box displayed in the display interface, so as to filter, based on the filtering conditions entered by the user, the audio and video data to be processed. At this time, the audio and video data to be processed that is displayed in the filtering result display interface can be used as audio and video data to be edited.

S220, acquire audio and video state management data, so as to edit, based on the audio and video state management data, the at least one audio and video data to be edited.

In this embodiment, after the audio and video data to be processed is uploaded to the system, in order to determine all data expressions of the audio and video data to be edited in the entire editing process, audio and video state management data can be acquired before the audio and video data to be edited is edited, so as to determine target audio and video editing plug-ins based on at least one piece of audio and video editing feature data contained in the audio and video state management data, so that the audio and video data to be edited can be edited based on the target audio and video editing plug-ins.

Optionally, acquiring audio and video state management data includes: acquiring at least one piece of audio and video editing feature data corresponding to a state object, and updating the audio and video state management data based on the at least one piece of audio and video editing feature data.

The state object may be an object with instance variables, can save data, and is not thread-safe. In this embodiment, the audio and video editing feature data can be stored in the state object, and the audio and video editing feature data can be read and written at any time.

In the practical application process, when audio and video state management data is determined, at least one piece of audio and video editing feature data corresponding to the state object can be first acquired, and the audio and video state management data is updated according to the audio and video editing feature data to make the audio and video state management data contain various attribute features in the audio and video editing process, so that target audio and video editing plug-ins that edit the audio and video data to be edited can be determined based on the audio and video state management data. The advantage of such setting lies in that an editing function to be implemented in the audio and video editing process can be determined, so that the selection of the target audio and video editing plug-ins can be implemented.

It should be noted that the audio and video state management data also includes various attribute feature data of audios, and these data can be set based on user needs.

It should be noted that the audio and video state management data contains all data of the audio and video data to be edited during the editing process. When the user has editing needs for the audio and video data to be edited, the audio and video state management data can be changed, so as to edit, based on the changed audio and video state management data, the audio and video data to be edited. At the same time, each time the audio and video state management data changes, the target audio routings used to play the target audio and video data will also change accordingly.

Based on this and the above technical solutions, the method also includes: when a change in the audio and video state management data is detected, traversing, based on an audio management module, the audio and video data to be edited, so that the audio and video data to be edited is edited based on the updated audio and video state management data.

The audio management module may be a collection of data used for audio and video data management.

In practical applications, when a change in the audio and video state management data is detected, the audio management module can be triggered. Furthermore, the audio management module can traverse, according to the changed audio and video state management data, all audio clips in the audio and video data to be edited, and re-create the modules connected in the target audio routings, so as to realize a mapping relationship between the updated audio and video state management data and the audio editing system based on the re-created target audio routings. The advantages of such setting lie in that the editing process of the audio and video data to be edited is simplified, and the editing efficiency is improved; in addition, the editing process can be changed at any time, thereby improving the user experience.

It should also be noted that during the practical editing process, situations where the currently performed editing operation needs to be undone and restored to the state before editing will be encountered. At this time, a history management module used for storing data of each editing operation can be created, so that when an undo operation is detected, data required by the user can be retrieved from this module.

Based on the above technical solutions, the method also includes: after audio and video state management data is determined, saving the audio and video state management data to a history management module, so as to retrieve, when an undo or rollback editing instruction corresponding to the audio and video data to be edited is received, corresponding audio and video state management data from the history management module for editing the audio and video data to be edited.

In this embodiment, the history management module may be a collection used to store data corresponding to each editing operation during the editing process. The undo or rollback editing instruction may be a pre-written program code which can be used to perform the undo or rollback operation. In the practical application process, the undo or rollback control can be set in advance in any area in an audio and video editing interface. When the user's trigger operation of the undo or rollback control is detected, an undo or rollback editing instruction can be generated and sent to a server, so that the server can respond to the undo or rollback editing instruction when receiving same.

In a specific implementation, after audio and video state management data is determined, the audio and video state management data can be stored in a history management module, and each time a change in the audio and video state management data is detected, the changed audio and video state management data can be stored in the history management module. At the same time, the audio and video state management data previously stored in the history management module will not be deleted.

Further, when a user's trigger operation of the pre-set undo or rollback control is detected, an undo or rollback editing instruction can be generated and sent to the server. When the server receives the undo or rollback editing instruction, corresponding audio and video state management data can be retrieved from the history management module, so as to re-edit, based on the retrieved audio and video state management data, the audio and video data to be edited. The advantages of such setting lie in that historical editing operation data can be stored, which facilitates its subsequent calling at any time; and when a fault occurs, troubleshooting can be carried out based on the pre-stored audio and video state management data.

It should be noted that each time the audio and video state management data changes, the audio and video state management data is stored in the history management module, so that the history management module stores audio and video state management data in various states; and the undo or rollback editing operation is to undo the editing operation at the current time, so that the audio and video data to be edited is rolled back to the state before editing. At this time, if the audio and video state management data needs to be retrieved from the history management module, the audio and video state management data corresponding to this undo or rollback editing operation can be determined from among a plurality of pieces of audio and video state management data corresponding to the data to be edited, so as to edit, based on the retrieved audio and video state management data, the audio and video data to be edited.

Based on this and the above technical solutions, the method also includes: when an undo or rollback control is detected, acquiring from the history management module the audio and video state management data with the minimum distance from the current time, and multiplexing the audio and video state management data.

The current time can be a trigger moment of the undo or rollback control.

In practical applications, while saving the audio and video state management data to the history management module, corresponding timestamps are generated, so that the audio and video state management data is stored in the history management module in the order of time displayed by the timestamps. When the trigger operation of the undo or rollback control is detected, the current time can be determined. When corresponding audio and video state management data is retrieved from the history management module, the audio and video state management data with the minimum distance from the current time can be determined according to the current time and the timestamps corresponding to each audio and video state management data; this audio and video state management data is used as audio and video state management data corresponding to the undo or rollback operation; and the audio and video data to be edited is edited again based on this audio and video state management data, so that the audio and video data to be edited can be rolled back to the state required by the user. The advantage of such setting lies in that when an undo or rollback operation is detected, corresponding audio and video state management data can be quickly retrieved, so that the undo or rollback function can be quickly implemented.

S230, when it is detected that audio and video data to be edited is triggered to be played, acquire each audio and video editing plug-in to be used.

S240, determine a target audio and video editing plug-in according to pre-received audio and video state management data and each audio and video editing plug-in to be used.

S250, based on functional modules that are integrated in the target audio and video editing plug-ins, edit the audio and video data to be edited, so as to obtain target audio and video data.

S260, play the target audio and video data based on target audio routing(s).

Figure 5:
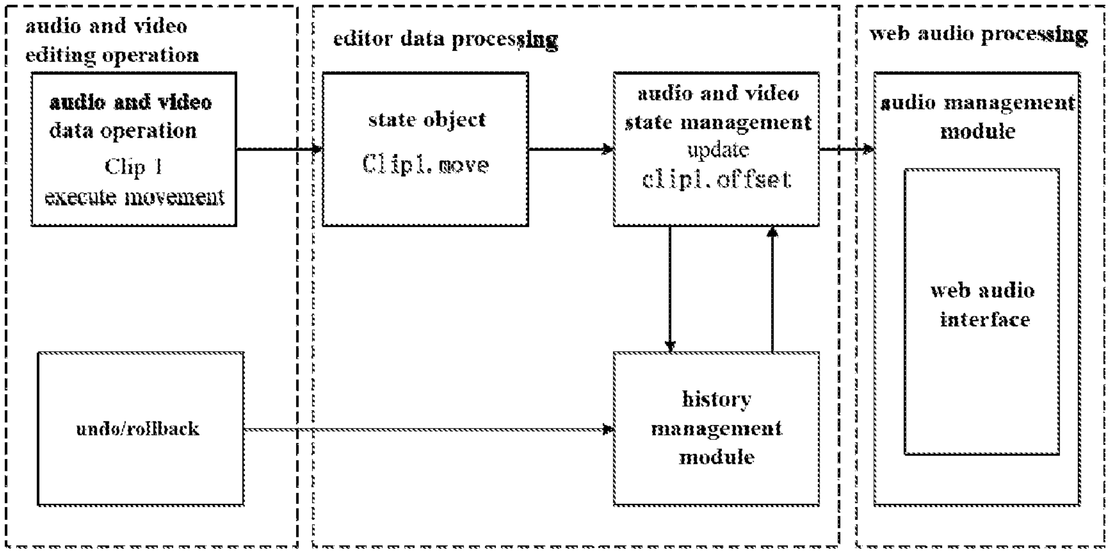
FIG. 5 is a schematic flowchart of an audio and video editing method provided in an embodiment of the present disclosure.

For example, the specific execution process of the audio and video editing method provided in this embodiment can be described with reference to FIG. 5: 1, performing a clipping operation on the audio clip 1 (Clip 1), and calling a clip.move method in the state object (State module); 2, processing a move logic based on clip.move in the state object (State module); 3, calling an audio and video state management data module (Voice Set) based on the State module to update a movement result to the Voice Set; 4, acquiring the updated Voice Set, saving a data snapshot and saving to the history management module (History Manager); 5, when the content of the Voice Set changes, notifying the audio management module (Audio Manager); and 6, based on the Audio Manager, traversing the audio and video state management data, and re-creating a data source module (Web audio Source Node), thus implementing the mapping relationship between Voice Set and Web audio.

In the technical solutions of the embodiments of the present disclosure, at least one uploaded audio and video data to be processed is received, so as to determine, based on the at least one audio and video data to be processed, audio and video data to be edited; audio and video state management data is then acquired, so as to edit, based on the audio and video state management data, the at least one audio and video data to be edited; when it is detected that audio and video data to be edited is triggered to be played, each audio and video editing plug-in to be used is acquired; target audio and video editing plug-ins are determined according to pre-received audio and video state management data and each audio and video editing plug-in to be used; based on functional modules that are integrated in the target audio and video editing plug-ins, the audio and video data to be edited is edited, so as to obtain target audio and video data; and the target audio and video data is played based on a target audio routing. Thus, the effect of editing, based on a browser, audio and video data to be edited is realized; in addition, the audio and video state management data is processed to realize a corresponding editing function, thereby improving the expression ability of multi-dimensional audio and video data, and achieving the effect of expressing complex editing processes based on data.

Figure 6:
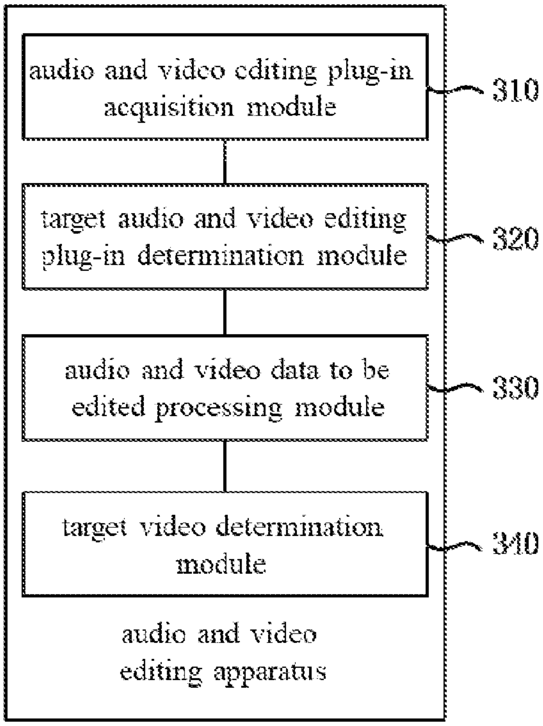
FIG. 6 is a schematic structural diagram of an audio and video editing apparatus provided in an embodiment of the present disclosure.

FIG. 6 is a schematic structural diagram of an audio and video editing apparatus provided in an embodiment of the present disclosure. As shown in FIG. 6, the apparatus includes: an audio and video editing plug-in acquisition module 310, a target audio and video editing plug-in determining module 320, an audio and video data to be edited processing module 330 and a target video determination module 340.

The audio and video editing plug-in acquisition module 310 is used for acquiring, when it is detected that audio and video data to be edited is triggered to be played, each audio and video editing plug-in to be used;

the target audio and video editing plug-in determination module 320 is used for determining target audio and video editing plug-ins according to pre-received audio and video state management data and each audio and video editing plug-in to be used;

the audio and video data to be edited processing module 330 is used for editing, based on functional modules that are integrated in the target audio and video editing plug-ins, the audio and video data to be edited, so as to obtain target audio and video data; and the target audio and video data play module 340 is used for playing the target audio and video data based on target audio routing(s).

Based on the above technical solutions, the apparatus also includes: an audio and video data to be processed receiving module and an audio and video state management data acquisition module.

The audio and video data to be processed receiving module is used for receiving, before it is detected that audio and video data to be edited are triggered to be played, at least one uploaded audio and video data to be processed, so as to determine, based on the at least one audio and video data to be processed, audio and video data to be edited; and the audio and video state management data acquisition module is used for acquiring audio and video state management data, so as to edit, based on the audio and video state management data, the at least one audio and video data to be edited.

Based on the above technical solutions, the audio and video state management data acquisition module includes: an audio and video state management data acquisition unit.

The audio and video state management data acquisition unit is used for acquiring at least one piece of audio and video editing feature data corresponding to a state object, and updating the audio and video state management data based on the at least one piece of audio and video editing feature data.

Based on the above technical solutions, the apparatus also includes: an audio and video state management data saving module.

The audio and video state management data saving module is used for saving the audio and video state management data to a history management module after the audio and video state management data is determined, so that when an undo or rollback editing instruction corresponding to the audio and video data to be edited is received, corresponding audio and video state management data is retrieved from the history management module to edit the audio and video data to be edited.

Based on the above technical solutions, the apparatus further includes: an audio and video state management data multiplexing module.

The audio and video state management data multiplexing module is used for acquiring, when an undo or rollback control is detected, from the history management module the audio and video state management data with the minimum distance from the current time, and multiplexing the audio and video state management data.

Based on the above technical solutions, the apparatus further includes: an audio and video data to be edited traversal module.

The audio and video data to be edited traversal module is used for traversing, when a change in the audio and video state management data is detected, the audio and video data to be edited based on an audio management module, so that the audio and video data to be edited is edited based on the updated audio and video state management data.

Based on the above technical solutions, the audio and video editing plug-ins to be used include a plurality of hook files which include function files used to edit the audio and video data to be edited.

Based on the above technical solutions, the target audio and video editing plug-in determination module 320 includes: a track data calling unit, a collection of data based unit and a target audio and video editing plug-in determining unit.

The track data calling unit is used for determining the number of tracks based on the audio and video state management data, and calling corresponding track data in sequence;

the collection of data based unit is used for being based on collections of data corresponding to at least one piece of audio and video editing feature data in the track data and the audio and video state management data; and the target audio and video editing plug-in determining unit is used for, for each audio and video editing plug-in to be used, if the audio and video editing plug-in currently to be used includes the audio and video editing feature data in the collections of data, determining that the audio and video editing plug-in currently to be used is the target audio and video editing plug-in.

Based on the above technical solutions, the apparatus also includes: a recording module creation module.

The recording module creation module is used for creating, in the process of determining the target audio and video editing plug-in and editing the audio and video data to be edited based on the target audio and video editing plug-in, a recording module to connect to the target audio routing.

Based on the above technical solutions, the apparatus further includes: a target audio routing determination module.

The target audio routing determination module is used for using the target audio routing corresponding to the last target audio and video editing plug-in as the target audio routing that is finally used to play the target audio and video data.

In the technical solutions provided in the embodiments of the present disclosure, when it is detected that audio and video data to be edited is triggered to be played, each audio and video editing plug-in to be used is acquired; target audio and video editing plug-ins are then determined according to pre-received audio and video state management data and each audio and video editing plug-in to be used; further, based on functional modules that are integrated in the target audio and video editing plug-ins, the audio and video data to be edited is edited, so as to obtain target audio and video data; and the target audio and video data is finally played based on target audio routing(s). Thus, it solves the problems of low efficiency and weak functionality in the prior art where editing and processing processes often require different applications or software to complete. It achieves the effect of carrying out, based on a browser, plug-in editing on audio and video data to be edited, and an audio and video editing process is simplified. In addition, target audio routings can be expanded by introducing audio and video editing plug-ins, which further improves the user experience.

The video processing apparatus provided in an embodiment of the present disclosure can execute the audio and video editing method provided in any embodiment of the present disclosure, and has corresponding functional modules and beneficial effects for executing the method.

It is worth noting that the various units and modules included in the above apparatus are only divided according to functional logic, but are not limited to the above divisions, as long as they can achieve corresponding functions. In addition, specific names of the functional units are just used to facilitate mutual differentiation, but not to limit the protection scope of the embodiments of the present disclosure.

Figure 7:
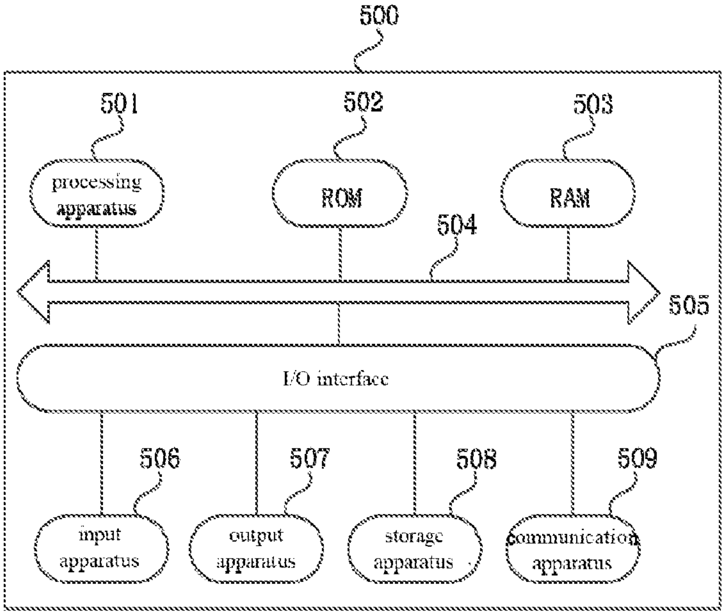
FIG. 7 is a schematic structural diagram of an electronic device provided in an embodiment of the present disclosure.

FIG. 7 is a schematic structural diagram of an electronic device provided in an embodiment of the present disclosure. Referring now to FIG. 7, a schematic structural diagram of an electronic device (e.g., the terminal device or server in FIG. 7) 500 suitable for implementing the embodiments of the present disclosure is shown. Terminal devices in the embodiments of the present disclosure may include, but are not limited to, mobile terminals such as mobile phones, laptops, digital broadcast receivers, PDAs (Personal Digital Assistants), PADs (tablet PCs), PMPs (Portable Multimedia Players), and vehicle-mounted terminals (e.g., vehicle-mounted navigation terminals), and fixed terminals such as digital TVs and desktop computers. The electronic device shown in FIG. 7 is only an example and should not impose any limitations on the functions and scope of use of the embodiments of the present disclosure.

As shown in FIG. 7, the electronic device 500 may include a processing apparatus (e.g., a central processing unit, a graphics processor, etc.) 501 that may execute various appropriate actions and processes according to a program stored in a read-only memory (ROM) 502 or a program loaded from a storage apparatus 508 into a random access memory (RAM) 503. In the RAM 503, various programs and data required for the operation of the electronic device 500 are also stored. The processing apparatus 501, the ROM 502 and the RAM 503 are connected to each other via a bus 504. An editing/output (I/O) interface 505 is also connected to bus 504.

Generally, the following apparatuses may be connected to the I/O interface 505: an input apparatus 506 including, for example, a touch screen, a touch pad, a keyboard, a mouse, a camera, a microphone, an accelerometer, a gyroscope, etc.; an output apparatus 507 including, for example, a liquid crystal display (LCD), a speaker, a vibrator, etc.; a storage apparatus 508 including, for example, a tape, a hard disk, etc.; and a communication apparatus 509. The communication apparatus 509 may allow the electronic device 500 to communicate wirelessly or by wire with other devices to exchange data. Although FIG. 7 illustrates the electronic device 500 with various apparatuses, it should be understood that it is not required to implement or provide all illustrated apparatuses. More or fewer apparatuses may alternatively be implemented or provided.

In particular, according to the embodiments of the present disclosure, the processes described above with reference to the flowcharts may be implemented as computer software programs. For example, an embodiment of the present disclosure includes a computer program product which includes a computer program carried on a non-transitory computer-readable medium, the computer program containing program codes for performing the method illustrated in the flowchart. In such embodiment, the computer program may be downloaded and installed from the network via the communication apparatus 509, or installed from the storage apparatus 508, or installed from the ROM 502. When the computer program is executed by the processing apparatus 501, the above functions defined in the method of the embodiment of the present disclosure are performed.

Names of messages or information exchanged between a plurality of apparatuses in the implementations of the present disclosure are for illustrative purposes only and are not used to limit the scope of these messages or information.

The electronic device provided in an embodiment of the present disclosure and the audio and video editing method provided in the above embodiments belong to the same inventive concept. Technical details that are not described in detail in this embodiment can be referred to the above embodiments, and this embodiment has the same beneficial effects as the above embodiments.

Embodiments of the present disclosure provide a computer storage medium on which a computer program is stored. When the program is executed by a processor, the audio and video editing method provided in the above embodiments is implemented.

It should be noted that the computer-readable medium mentioned above in the present disclosure may be a computer-readable signal medium or a computer-readable storage medium, or any combination of the above two. The computer-readable storage medium may be, for example, but is not limited to, electrical, magnetic, optical, electromagnetic, infrared, or semiconductor system, apparatus or device, or any combination thereof. More specific examples of computer-readable storage medium may include, but are not limited to: an electrical connection having one or more wires, a portable computer disk, a hard drive, a random access memory (RAM), a read-only memory (ROM), an erasable programmed read-only memory (EPROM or flash memory), optical fibers, a portable compact disk read-only memory (CD-ROM), an optical storage device, a magnetic storage device, or any suitable combination of the above. In the present disclosure, the computer-readable storage medium may be any tangible medium that contains or stores a program for use by or in conjunction with an instruction execution system, apparatus, or device. In the present disclosure, the computer-readable signal medium may include a data signal propagated in a baseband or as part of a carrier wave, carrying computer-readable program codes therein. Such propagated data signals may take various forms, including but not limited to electromagnetic signals, optical signals, or any suitable combination of the above. The computer-readable signal medium may also be any computer-readable medium other than a computer-readable storage medium and can send, propagate, or transmit a program for use by or in conjunction with an instruction execution system, apparatus, or device. Program codes embodied on the computer-readable medium may be transmitted using any suitable medium, including but not limited to: wires, optical cables, RF (radio frequency), etc., or any suitable combination of the above.

In some implementations, the client and server can communicate using any currently known or future developed network protocol such as HTTP (HyperText Transfer Protocol), and can communicate (e.g., a communications network) and interconnect with digital data in any form or medium. Examples of communication networks include a local area network ("LAN"), a wide area network ("WAN"), the Internet work (e.g., the Internet), and an end-to-end network (e.g., ad hoc end-to-end networks), as well as any currently known or future developed network.

The above computer-readable medium may be included in the above electronic device, and may also exist independently without being assembled into the electronic device.

The above computer-readable medium carries one or more programs which, when being executed by the electronic device, cause the electronic device to:

when it is detected that audio and video data to be edited is triggered to be played, acquire each audio and video editing plug-in to be used;

determine target audio and video editing plug-ins according to pre-received audio and video state management data and each audio and video editing plug-in to be used;

based on functional modules that are integrated in the target audio and video editing plug-ins, edit the audio and video data to be edited, so as to obtain target audio and video data; and play the target audio and video data based on target audio routing(s).

Computer program codes for performing operations of the present disclosure may be written in one or more programming languages or combinations thereof, including but not limited to object-oriented programming languages-such as Java, Smalltalk and C++, and also including conventional procedural programming languages-such as "C" or similar programming languages. The program codes may be executed entirely on a user's computer, partly on the user's computer, as a stand-alone software package, partly on the user's computer and partly on a remote computer, or entirely on the remote computer or server. In situations involving a remote computer, the remote computer can be connected to the user's computer through any kind of network, including a local area network (LAN) or a wide area network (WAN), or can be connected to an external computer (e.g., being connected using an Internet service provider through Internet connection).

The flowcharts and block diagrams in the accompanying drawings illustrate the architecture, functionality and operations of possible implementations of systems, methods and computer program products according to various embodiments of the present disclosure. In this regard, each block in the flowcharts or block diagrams may represent a module, a program segment, or portion of codes that contains one or more executable instructions that implement specified logic functions. It should also be noted that, in some alternative implementations, the functions noted in the blocks may occur out of the order noted in the accompanying drawings. For example, two blocks shown one after another may practically execute substantially in parallel, or may sometimes execute in the reverse order, depending on the functionality involved. It will also be noted that each block in the block diagrams and/or flowcharts and combinations of blocks in the block diagrams and/or flowcharts can be implemented by special purpose hardware-based systems that perform the specified functions or operations, or can be implemented using a combination of specialized hardware and computer instructions.

The units involved in the embodiments of the present disclosure can be implemented in software or hardware. The name of a unit does not constitute a limitation on the unit itself under certain circumstances. For example, the first acquisition unit can also be described as "the unit that acquires at least two Internet Protocol addresses".

The functions described above herein may be performed, at least in part, by one or more hardware logic components. For example and without limitation, exemplary types of hardware logic components that may be used include: a field programmable gate array (FPGA), an application specific integrated circuit (ASIC), an application specific standard product (ASSP), a system on chip (SOC), a complex programmable logical device (CPLD), etc.

In the context of the present disclosure, a machine-readable medium may be a tangible medium that may contain or store a program for use by or in conjunction with an instruction execution system, apparatus, or device. The machine-readable medium may be a machine-readable signal medium or a machine-readable storage medium and may include, but is not limited to, electronic, magnetic, optical, electromagnetic, infrared, or semiconductor systems, apparatuses or devices, or any suitable combination of the above. More specific examples of the machine-readable storage medium would include one or more wire-based electrical connections, a laptop disk, a hard disk, a random access memory (RAM), a read-only memory (ROM), an erasable programmable read-only memory (EPROM or flash memory), optical fibers, a portable compact disk read-only memory (CD-ROM), an optical storage device, a magnetic storage device, or any suitable combination of the above.

According to one or more embodiments of the present disclosure, [Example 1] provided is an audio and video editing method, including:

when it is detected that audio and video data to be edited is triggered to be played, acquiring each audio and video editing plug-in to be used;

determining target audio and video editing plug-ins according to pre-received audio and video state management data and each audio and video editing plug-in to be used;

based on functional modules that are integrated in the target audio and video editing plug-ins, editing the audio and video data to be edited, so as to obtain target audio and video data; and playing the target audio and video data based on an target audio routing.

According to one or more embodiments of the present disclosure, [Example 2] provided is an audio and video editing method, also including:

optionally, receiving at least one uploaded audio and video data to be processed, so as to determine, based on the at least one audio and video data to be processed, audio and video data to be edited; and acquiring audio and video state management data, so as to edit, based on the audio and video state management data, the at least one audio and video data to be edited.

According to one or more embodiments of the present disclosure, [Example 3] provided is an audio and video editing method, also including:

optionally, acquiring at least one piece of audio and video editing feature data corresponding to a state object, and updating the audio and video state management data based on the at least one piece of audio and video editing feature data.

According to one or more embodiments of the present disclosure, [Example 4] provided is an audio and video editing method, also including:

optionally, after the audio and video state management data is determined, saving the audio and video state management data to a history management module, so that when an undo or rollback editing instruction corresponding to the audio and video data to be edited is received, corresponding audio and video state management data is retrieved from the history management module to edit the audio and video data to be edited.

According to one or more embodiments of the present disclosure, [Example 5] provided is an audio and video editing method, also including:

optionally, when an undo or rollback control is detected, acquiring from the history management module the audio and video state management data with the minimum distance from the current time, and multiplexing the audio and video state management data.

According to one or more embodiments of the present disclosure, [Example 6] provided is an audio and video editing method, also including:

optionally, when a change in the audio and video state management data is detected, traversing the audio and video data to be edited based on an audio management module, so that the audio and video data to be edited is edited based on the updated audio and video state management data.

According to one or more embodiments of the present disclosure, [Example 7] provided is an audio and video editing method, also including:

optionally, the audio and video editing plug-ins to be used including a plurality of hook files which include function files used to edit the audio and video data to be edited.

According to one or more embodiments of the present disclosure, [Example 8] provided is an audio and video editing method, also including:

optionally, determining the number of tracks based on the audio and video state management data, and calling corresponding track data in sequence;

being based on collections of data corresponding to at least one piece of audio and video editing feature data in the track data and the audio and video state management data; and for each audio and video editing plug-in to be used, if the audio and video editing plug-in currently to be used includes the audio and video editing feature data in the collections of data, determining that the audio and video editing plug-in currently to be used is the target audio and video editing plug-in.

According to one or more embodiments of the present disclosure, [Example 9] provided is an audio and video editing method, also including:

optionally, in the process of determining the target audio and video editing plug-in and editing the audio and video data to be edited based on the target audio and video editing plug-in, creating a recording module to connect to the target audio routing.

According to one or more embodiments of the present disclosure, [Example 10] provided is an audio and video editing method, also including:

optionally, using the target audio routing corresponding to the last target audio and video editing plug-in as the target audio routing that is finally used to play the target audio and video data.

According to one or more embodiments of the present disclosure, [Example 11]provided is an audio and video editing apparatus, including:

an audio and video editing plug-in acquisition module, which is used for acquiring, when it is detected that audio and video data to be edited is triggered to be played, each audio and video editing plug-in to be used;

a target audio and video editing plug-in determination module, which is used for determining a target audio and video editing plug-in according to pre-received audio and video state management data and each audio and video editing plug-in to be used;

an audio and video data to be edited processing module, which is used for editing, based on functional modules that are integrated in the target audio and video editing plug-ins, the audio and video data to be edited, so as to obtain target audio and video data; and a target audio and video data play module, which is used for playing the target audio and video data based on target audio routing(s).

The above description is only an illustration of the preferred embodiments of the present disclosure and the technical principles applied. Those skilled in the art should understand that the disclosure scope involved in the present disclosure is not limited to technical solutions composed of specific combinations of the above technical features, but should also cover other technical solutions formed by any combinations of the above technical features or equivalent features without departing from the above disclosed concept, for example, a technical solution formed by replacing the above features with technical features with similar functions disclosed (but not limited to) in the present disclosure.

In addition, although operations are depicted in a specific order, this should not be understood as requiring that these operations be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in a plurality of embodiments separately or in any suitable sub-combination.

Although this subject matter has been described in a language specific to structural features and/or methodological actions, it should be understood that the subject matter defined in the appended claims is not necessarily limited to the specific features or actions described above. Rather, the specific features and actions described above are merely example forms of implementing the claims.

What is claimed is:

1. An audio and video editing method, comprising:

when it is detected that audio and video data to be edited is triggered to be played, acquiring each audio and video editing plug-in to be used from the plug-in library;

determining target audio and video editing plug-ins according to pre-received audio and video state management data and each audio and video editing plug-in to be used;

based on functional modules that are integrated in the target audio and video editing plug-ins, editing the audio and video data to be edited, so as to obtain target audio and video data; and playing the target audio and video data based on a target audio routing that is an audio processing graph built from audio modules linked together;

wherein before it is detected that audio and video data to be edited is triggered to be played, the method further comprises:

receiving at least one uploaded audio and video data to be processed, so as to determine, based on the at least one audio and video data to be processed, audio and video data to be edited; and acquiring audio and video state management data, so as to edit, based on the audio and video state management data, the at least one audio and video data to be edited, wherein the audio and video data to be edited is displayed on a browser-based display interface;

wherein the process of determining the target audio and video editing plug-in and editing the audio and video data to be edited based on the target audio and video editing plug-in further comprises: creating a recording module to connect to the target audio routing, and the recording module is a module that processes audio and video data and implements playing of the processed audio and video data; and wherein if there are a plurality of target audio and video editing plug-ins, corresponding target audio routings are generated after editing the audio and video data to be edited based on each target audio and video editing plug-in, and the method further comprises: using the target audio routing corresponding to the last target audio and video editing plug-in as the target audio routing that is finally used to play the target audio and video data, so that the target audio and video data is connected to a corresponding play terminal thereof for playing.

2. The method according to claim 1, wherein acquiring audio and video state management data comprises:

acquiring at least one piece of audio and video editing feature data corresponding to a state object, and updating the audio and video state management data based on the at least one piece of audio and video editing feature data.

3. The method according to claim 1, after the audio and video state management data is determined, further comprising:

saving the audio and video state management data to a history management module, so that when an undo or rollback editing instruction corresponding to the audio and video data to be edited is received, corresponding audio and video state management data is retrieved from the history management module to edit the audio and video data to be edited.

4. The method according to claim 3, further comprising:

when an undo or rollback control is detected, acquiring from the history management module the audio and video state management data with the minimum distance from the current time, and multiplexing the audio and video state management data.

5. The method according to claim 1, further comprising:

when a change in the audio and video state management data is detected, traversing the audio and video data to be edited based on an audio management module, so that the audio and video data to be edited is edited based on the updated audio and video state management data.

6. The method according to claim 1, wherein the audio and video editing plug-in to be used comprise a plurality of hook files which comprise function files used to edit the audio and video data to be edited.

7. The method according to claim 1, wherein determining target audio and video editing plug-ins according to pre-received audio and video state management data and each audio and video editing plug-in to be used comprises:

determining the number of tracks based on the audio and video state management data, and calling corresponding track data in sequence;

being based on collections of data corresponding to at least one piece of audio and video editing feature data in the track data and the audio and video state management data; and for each audio and video editing plug-in to be used, if the audio and video editing plug-in currently to be used comprises the audio and video editing feature data in the collections of data, determining that the audio and video editing plug-in currently to be used is the target audio and video editing plug-in.

8. An electronic device, comprising:

one or more processors; and a storage apparatus, which is used for storing one or more programs, when the one or more programs are executed by the one or more processors, the one or more processors being caused to implement the following operations:

when it is detected that audio and video data to be edited is triggered to be played, acquiring each audio and video editing plug-in to be used from the plug-in library;

determining target audio and video editing plug-ins according to pre-received audio and video state management data and each audio and video editing plug-in to be used;

based on functional modules that are integrated in the target audio and video editing plug-ins, editing the audio and video data to be edited, so as to obtain target audio and video data; and playing the target audio and video data based on a target audio routing that is an audio processing graph built from audio modules linked together;

wherein before it is detected that audio and video data to be edited is triggered to be played, when the one or more programs are executed by the one or more processors, the one or more processors being caused to further implement the following operations:

receiving at least one uploaded audio and video data to be processed, so as to determine, based on the at least one audio and video data to be processed, audio and video data to be edited; and acquiring audio and video state management data, so as to edit, based on the audio and video state management data, the at least one audio and video data to be edited, wherein the audio and video data to be edited is displayed on a browser-based display interface;

wherein the process of determining the target audio and video editing plug-in and editing the audio and video data to be edited based on the target audio and video editing plug-in further comprises: creating a recording module to connect to the target audio routing, and the recording module is a module that processes audio and video data and implements playing of the processed audio and video data; and wherein if there are a plurality of target audio and video editing plug-ins, corresponding target audio routings are generated after editing the audio and video data to be edited based on each target audio and video editing plug-in, and when the one or more programs are executed by the one or more processors, the one or more processors are caused to further implement the following operations: using the target audio routing corresponding to the last target audio and video editing plug-in as the target audio routing that is finally used to play the target audio and video data, so that the target audio and video data is connected to a corresponding play terminal thereof for playing.

9. The electronic device according to claim 8, wherein acquiring audio and video state management data comprises:

acquiring at least one piece of audio and video editing feature data corresponding to a state object, and updating the audio and video state management data based on the at least one piece of audio and video editing feature data.

10. The electronic device according to claim 8, after the audio and video state management data is determined, when the one or more programs are executed by the one or more processors, the one or more processors being caused to further implement the following operations:

saving the audio and video state management data to a history management module, so that when an undo or rollback editing instruction corresponding to the audio and video data to be edited is received, corresponding audio and video state management data is retrieved from the history management module to edit the audio and video data to be edited.

11. The electronic device according to claim 10, when the one or more programs are executed by the one or more processors, the one or more processors being caused to further implement the following operations:

when an undo or rollback control is detected, acquiring from the history management module the audio and video state management data with the minimum distance from the current time, and multiplexing the audio and video state management data.

12. A non-transitory storage medium containing computer-executable instructions which, when executed by a computer processor, are used to perform the following operations:

when it is detected that audio and video data to be edited is triggered to be played, acquiring each audio and video editing plug-in to be used from the plug-in library;

determining target audio and video editing plug-ins according to pre-received audio and video state management data and each audio and video editing plug-in to be used;

based on functional modules that are integrated in the target audio and video editing plug-ins, editing the audio and video data to be edited, so as to obtain target audio and video data; and playing the target audio and video data based on a target audio routing that is an audio processing graph built from audio modules linked together;

wherein before it is detected that audio and video data to be edited is triggered to be played, when executed by the computer processor, the computer-executable instructions being further used to perform the following operations:

receiving at least one uploaded audio and video data to be processed, so as to determine, based on the at least one audio and video data to be processed, audio and video data to be edited; and acquiring audio and video state management data, so as to edit, based on the audio and video state management data, the at least one audio and video data to be edited, wherein the audio and video data to be edited is displayed on a browser-based display interface;

wherein the process of determining the target audio and video editing plug-in and editing the audio and video data to be edited based on the target audio and video editing plug-in further comprises: creating a recording module to connect to the target audio routing, and the recording module is a module that processes audio and video data and implements playing of the processed audio and video data; and wherein if there are a plurality of target audio and video editing plug-ins, corresponding target audio routings are generated after editing the audio and video data to be edited based on each target audio and video editing plug-in, and the computer-executable instructions which, when executed by a computer processor, are used to further perform the following operations: using the target audio routing corresponding to the last target audio and video editing plug-in as the target audio routing that is finally used to play the target audio and video data, so that the target audio and video data is connected to a corresponding play terminal thereof for playing.

13. The non-transitory storage medium according to claim 12, wherein acquiring audio and video state management data comprises:

acquiring at least one piece of audio and video editing feature data corresponding to a state object, and updating the audio and video state management data based on the at least one piece of audio and video editing feature data.

14. The non-transitory storage medium according to claim 12, after the audio and video state management data is determined, when executed by the computer processor, the computer-executable instructions being further used to perform the following operations:

saving the audio and video state management data to a history management module, so that when an undo or rollback editing instruction corresponding to the audio and video data to be edited is received, corresponding audio and video state management data is retrieved from the history management module to edit the audio and video data to be edited.

15. The non-transitory storage medium according to claim 14, when executed by the computer processor, the computer-executable instructions being further used to perform the following operations:

when an undo or rollback control is detected, acquiring from the history management module the audio and video state management data with the minimum distance from the current time, and multiplexing the audio and video state management data.

* * * * *